United States Patent
Steinbichler et al.

(10) Patent No.: US 10,200,670 B2
(45) Date of Patent: Feb. 5, 2019

(54) METHOD AND APPARATUS FOR DETERMINING THE 3D COORDINATES OF AN OBJECT

(71) Applicant: Steinbichler Optotechnik GmbH, Neubeuern (DE)

(72) Inventors: Marcus Steinbichler, Neubeuern (DE); Herbert Daxauer, Walchsee (AT); Thomas Mayer, Kolbermoor (DE); Markus Basel, Raubling (DE)

(73) Assignee: CARL ZEISS OPTOTECHNIK GMBH, Neubeuern (DE)

( * ) Notice: Subject to any disclaimer, the term of this patent is extended or adjusted under 35 U.S.C. 154(b) by 413 days.

(21) Appl. No.: 13/632,434

(22) Filed: Oct. 1, 2012

(65) Prior Publication Data

US 2013/0271573 A1 Oct. 17, 2013

(30) Foreign Application Priority Data

Sep. 30, 2011 (DE) .................... 10 2011 114 674

(51) Int. Cl.
*H04N 13/02* (2006.01)
*G01B 11/25* (2006.01)
*H04N 13/204* (2018.01)

(52) U.S. Cl.
CPC ....... *H04N 13/204* (2018.05); *G01B 11/2513* (2013.01)

(58) Field of Classification Search
CPC .......... H04N 13/02; G01D 5/38; G01C 25/00; G01B 11/25; G01B 11/03; G01B 11/00; G06K 9/00

(Continued)

(56) References Cited

U.S. PATENT DOCUMENTS

| 4,753,569 A | 6/1988 | Pryor |
| 5,083,073 A | 1/1992 | Kato |

(Continued)

FOREIGN PATENT DOCUMENTS

| DE | 3712958 C1 | 10/1988 |
| DE | 19536294 A1 | 4/1997 |

(Continued)

OTHER PUBLICATIONS

S. Jecic, N. Drvar: The Assessment of Structured Light and Laser Scanning Methods in 3D Shape Measurements: 4th International Congress of Croatian Society of Mechanics, Sep. 18-20, 2003, Bizovac, Croatia, pp. 237-244.

(Continued)

*Primary Examiner* — Marnie A Matt
(74) *Attorney, Agent, or Firm* — Dilworth & Barrese, LLP; Michael J. Musella, Esq.

(57) ABSTRACT

In a method for determining the 3D coordinates of an object a pattern (6) is projected onto the object (1) by a projector (3), the light reflected by the object (1) is captured by a camera (4), and the shots recorded by the camera (4) are evaluated. Reference marks (8) on and/or beside the object (1) are recorded by a reference camera (5). The reference camera (5) has a larger field of view (9) than the camera (4). To improve such method, the reference camera (5) is connected with the camera (4) or with a 3D sensor (2) which comprises the projector (3) and the camera (4).

20 Claims, 2 Drawing Sheets

(58) Field of Classification Search
USPC .......................................... 348/46; 382/106
See application file for complete search history.

(56) References Cited

U.S. PATENT DOCUMENTS

| | | | |
|---|---|---|---|
| 5,175,601 A * | 12/1992 | Fitts | G01B 11/2513 |
| | | | 250/237 G |
| 5,198,877 A | 3/1993 | Schulz | |
| 6,026,172 A * | 2/2000 | Lewis, Jr. | G02B 7/102 |
| | | | 250/559.01 |
| 6,078,846 A | 6/2000 | Greer et al. | |
| 6,175,647 B1 | 1/2001 | Schick, et al. | |
| 6,542,249 B1 | 4/2003 | Kofman et al. | |
| 8,243,123 B1 * | 8/2012 | Geshwind | H04N 13/0022 |
| | | | 348/42 |
| 2003/0025788 A1 | 2/2003 | Beardsley | |
| 2003/0079360 A1 | 5/2003 | Ziegler | |
| 2003/0112448 A1 | 6/2003 | Maidhof | |
| 2004/0143359 A1 * | 7/2004 | Yogo | A45D 31/00 |
| | | | 700/161 |
| 2004/0234122 A1 * | 11/2004 | Kochi | G01B 11/24 |
| | | | 382/154 |
| 2005/0174581 A1 * | 8/2005 | Liu | G01B 11/2441 |
| | | | 356/602 |
| 2006/0265177 A1 | 11/2006 | Steinbichler | |
| 2007/0081714 A1 * | 4/2007 | Wallack | G06K 9/209 |
| | | | 382/152 |
| 2008/0112700 A1 * | 5/2008 | Foxenland | G03B 13/02 |
| | | | 396/148 |
| 2008/0201101 A1 * | 8/2008 | Hebert | G01B 11/245 |
| | | | 702/152 |
| 2009/0067706 A1 | 3/2009 | Lapa | |
| 2009/0080766 A1 * | 3/2009 | Daxauer | G01B 11/2545 |
| | | | 382/154 |
| 2009/0323121 A1 | 12/2009 | Valkenburg | |
| 2010/0092041 A1 | 4/2010 | Kim et al. | |
| 2010/0134598 A1 * | 6/2010 | St-Pierre | G01B 11/2513 |
| | | | 348/47 |
| 2010/0231711 A1 * | 9/2010 | Taneno | G06K 9/00214 |
| | | | 348/135 |
| 2010/0283842 A1 * | 11/2010 | Guissin | G02B 13/06 |
| | | | 348/68 |
| 2011/0007326 A1 | 1/2011 | Daxauer et al. | |
| 2011/0134225 A1 * | 6/2011 | Saint-Pierre | G01B 11/03 |
| | | | 348/47 |
| 2012/0120072 A1 | 5/2012 | Se et al. | |
| 2013/0050410 A1 * | 2/2013 | Steinbichler | G01B 11/25 |
| | | | 348/42 |
| 2013/0100282 A1 * | 4/2013 | Siercks | G01B 11/2513 |
| | | | 348/135 |
| 2013/0293684 A1 * | 11/2013 | Becker | G01B 11/245 |
| | | | 348/47 |
| 2014/0168370 A1 * | 6/2014 | Heidemann | G01B 11/2513 |
| | | | 348/46 |
| 2014/0186218 A1 | 7/2014 | Sweet et al. | |
| 2014/0198185 A1 * | 7/2014 | Haugen | G06T 7/0008 |
| | | | 348/48 |

FOREIGN PATENT DOCUMENTS

| | | | | |
|---|---|---|---|---|
| DE | 19536294 C2 | | 4/1997 | |
| DE | 19536297 | | 4/1997 | |
| DE | 19840334 Z1 | | 8/1999 | |
| DE | 102005020844 B3 | | 7/2006 | |
| DE | 102005051020 | | 4/2007 | |
| DE | 102005051020 A1 | | 4/2007 | |
| DE | 102006048234 | | 4/2008 | |
| DE | 102007042963 | | 3/2009 | |
| DE | 102009032771 | | 1/2011 | |
| DE | 102009032771 A1 * | | 1/2011 | |
| DE | 102009032771 A1 * | | 1/2011 | |
| DE | 102011011360 A1 | | 8/2012 | |
| EP | 1134546 A2 | | 9/2001 | |
| EP | 1189732 B1 | | 5/2003 | |
| EP | 1593930 A1 | | 11/2005 | |
| EP | 2034269 A1 | | 3/2009 | |
| EP | 2273229 | | 1/2011 | |
| EP | 2273229 A1 | | 1/2011 | |
| EP | 2400261 A1 * | | 12/2011 | |
| EP | 2400261 A1 * | | 12/2011 | G01B 11/2513 |
| EP | 2489977 A2 | | 2/2012 | |
| JP | 201069634 A | | 8/2010 | |
| JP | 2011017700 A | | 1/2011 | |
| JP | 2012031979 A | | 2/2012 | |
| WO | 0227264 A1 | | 4/2002 | |
| WO | 2004/011876 | | 2/2004 | |
| WO | 2004011876 A1 | | 2/2004 | |
| WO | WO 2004011876 A1 * | | 2/2004 | G01B 11/25 |
| WO | WO-2004011876 A1 * | | 2/2004 | |
| WO | 2009086495 A2 | | 9/2009 | |
| WO | WO-2011160962 A1 * | | 12/2011 | |
| WO | WO 2011160962 A1 * | | 12/2011 | G01B 11/2513 |

OTHER PUBLICATIONS

A. Georgopoulos, CH. Ioannidis, A. Valanis: Assessing the Performance of a Structured Light Scanner: International Archives of Photogrammetry, Remote Sensing and Spatial Information Sciences, vol. XXXVIII, Part 5 Commission V Symposium, Newcastle upon Tyne, UK 2010, pp. 250 to 255.

K. Al-Manasirr, C.S. Fraser: Registration of Terrestrial Laser Scanner Data Using Imagery: ASPRS 2006, Annual Conference Reno, Nevada, May 1-5, 2006.

Annex bundle regarding prior public use of ATOS III+ Triple Scanner—MV700 as per order No. GOMI 10401A, delivered on Apr. 29, 2011.

Opposition to DE 10 2011 114 674.5 B4 dated Sep. 30, 2016.

Opposition dated Oct. 28, 2015.

Addendum to the Summons in Respect of File Reference 10 2011 114 674.5—Date of Hearing Sep. 21, 2017.

Summons dated Jul. 16, 2014.

Communication enclosing the European Search Report from the European Patent Office dated Mar. 6, 2013.

Communication Pursuant to Article 94(3) EPC.

Summons to Attend Oral Proceedings Pursuant to Rule 115(1) EPC dated Nov. 30, 2016.

Examination Request dated Oct. 25, 2011.

Japanese Office Action dated May 9, 2017.

Decision announced at the hearing on Sep. 21, 2017.

Minutes of the public hearing in the opposition proceedings dated Sep. 21, 2017.

Related U.S. Appl. No. 13/397,056.

Opposition dated Sep. 8, 2018 of EP2574876B1 with English translation thereof.

Correspondence Table between documents cited in the Opposition dated Sep. 8, 2018 regarding the parallel EP patent and the Opposition dated Oct. 28, 2015 regarding the parallel DE patent.

Stjepan Jecić, Nenad Drvar: The Assessment of Structured Light and Laser Scanner Methods in 3D Shape Measurements, in: 4th International Congress of Croatian Society of Mechanics, September 18-20, 2003, Bizovac, Croatia, pp. 237-244.

Annex bundle relating to alleged prior public use ATOS III+ Triple Scanner MV700; Invoice # D1104291 of 29.04.2011 relating to order GOM110401A, Packing List of 29.04.2011 relating to order GOM110401A; Photograph of the delivered ATOS III+ Triple Scanners MV700.

* cited by examiner

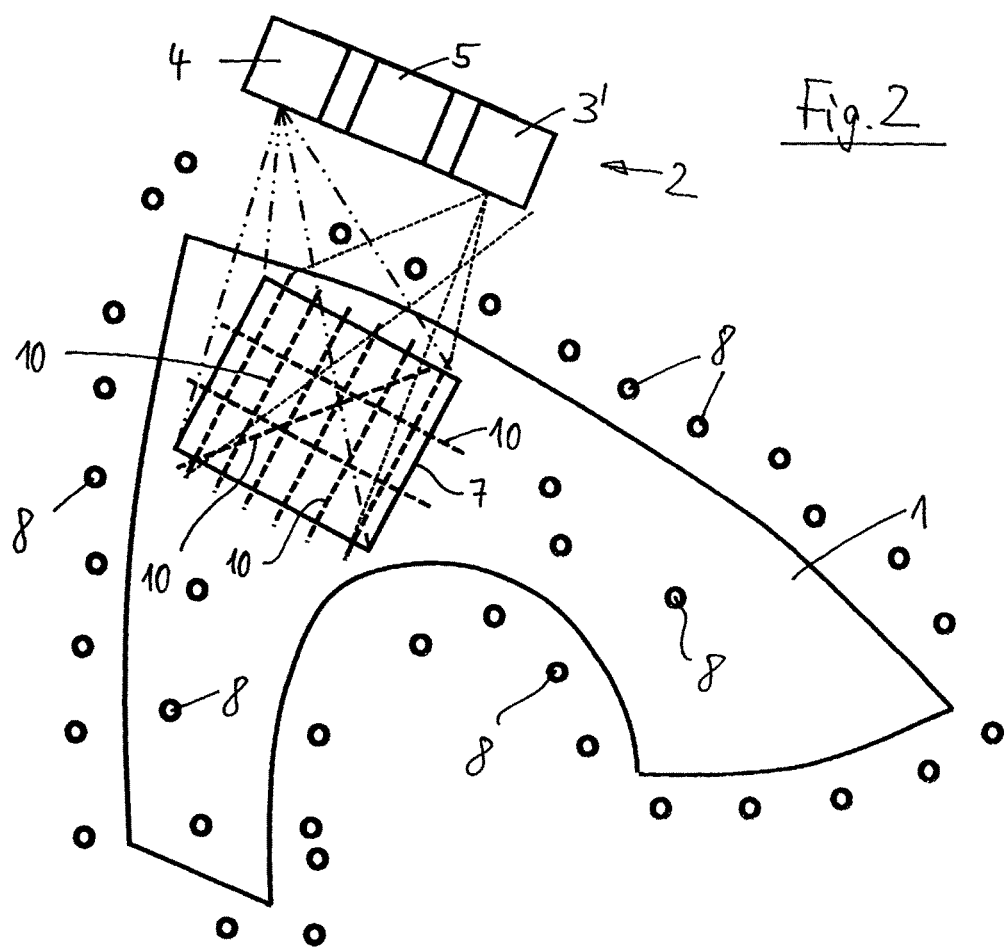

METHOD AND APPARATUS FOR DETERMINING THE 3D COORDINATES OF AN OBJECT

BACKGROUND OF THE INVENTION

This invention relates to a method for determining the 3D coordinates of an object and to an apparatus for carrying out such method.

In the method, a pattern is projected onto the object. The light reflected by the object is captured and evaluated. The apparatus for carrying out such method comprises a projector for projecting a pattern onto the object, a camera for recording the object, and an evaluating means for evaluating the shots recorded.

Methods and apparatuses of this kind are known already, for example from DE 10 2006 048 234 A1 and DE 10 2007 042 963 A1. In these methods, a stripe pattern can be projected onto the object. Usually, the stripe pattern is projected onto the object by the method of white-light stripe projection, i.e. with white light.

As for determining the 3D coordinates of the object a single shot generally is not sufficient to satisfy the measurement requirements and/or to completely cover the object, it is required to position the pattern projection system at various recording positions in the space and to transfer the shots made there into a common, superordinate coordinate system, which can also be referred to as absolute coordinate system. This process frequently referred to as "global registration" requires a high accuracy.

In a previously known method of this kind shots are made which partly overlap. These shots can be oriented to each other via an optimization of the overlap regions. However, with larger objects with little surface structure, the method possibly is not sufficiently accurate.

Furthermore, there are known methods in which reference marks are used, which are mounted on and/or beside the object and/or on one or more of the set-ups surrounding the object. The reference marks initially are calibrated. Preferably, this is effected by the method of photogrammetry. By means of the reference marks, which are detected by a pattern projection system, in particular a stripe projection system, the various shots of the object can be transformed onto the calibrated points, so that a global registration is possible.

From EP 2 273 229 A1 a method is known, in which for determining the 3D coordinates of an object a stripe pattern is projected onto the object by a projector. The stripe pattern reflected by the object is recorded by a camera which comprises an optical system and an area sensor, in particular a CCD sensor or CMOS sensor. The projector and the camera form a stripe projection system. In the vicinity of the object a plurality of reference set-ups are arranged, which each include a plurality of reference marks. The reference set-ups initially are surveyed. Subsequently, the 3D coordinates of the object are determined by the stripe projection system.

From WO 2004/011876 A1 an apparatus according to the generic part of claim 8 is known. The apparatus comprises a projector for projecting a pattern onto the object, a camera for recording the object, and an evaluating means for evaluating the shots of the object. The apparatus furthermore comprises a projection means for projecting reference marks onto the object and a further camera for recording the reference marks.

From DE 195 36 297 A1 a method for the geometrical calibration of optical 3D sensors for the three-dimensional survey of objects is known, in which a pattern is projected onto the object and the light reflected by the object is recorded and evaluated by a camera. In the image field of the camera a calibration means with at least four calibrated and a plurality of further signal marks or reference marks is located, which are recorded by the camera.

From DE 10 2005 051 020 A1 a method for the three-dimensional digitization of bodies is known, in which a camera is moved around the body to be digitized. The body to be digitized is surrounded by a plurality of photogrammetrically evaluable marks. Around the body, a plurality of light pattern projectors furthermore are stationarily mounted, which are switched on one after the other.

US 2010/0092041 A1 discloses a method for determining the three-dimensional shape of an object, in which a pattern is projected onto the object and the light reflected by the object is captured and evaluated by a camera. The camera furthermore detects a reference mark beside the object.

SUMMARY OF THE INVENTION

It is the object of the invention to propose an improved method as indicated above and an improved apparatus as indicated above.

In a method as indicated above, this object is solved by the features herein. Reference marks on and/or beside the object are recorded by a reference camera. The reference camera has a larger field of view than the camera. The reference camera is connected with the camera or with a 3D sensor which comprises the projector and the camera. The reference marks can already be present on the object. In particular, characteristic regions of the object can be used as reference marks. Instead or in addition, reference marks can be mounted on the object and/or be positioned beside the object. In particular those reference marks can be used which are described in DE 10 2009 032 262 A1, to which reference is made here expressly. Thus, there can be used reference marks which are inherently coded and/or reference marks which are not inherently coded, but which are spatially arranged relative to each other such that this spatial arrangement includes a coding. Several reference marks can be combined to one or more reference set-ups.

It is possible to take several shots of the object with the camera. Several or all shots can overlap. Putting the individual shots together in a superordinate coordinate system can be effected by means of photogrammetry. For this purpose, the reference marks are surveyed by the reference camera.

In an apparatus as indicated above, the object of the invention is solved by the features herein. The apparatus comprises a reference camera for recording reference marks on and/or beside the object. The reference camera has a larger field of view than the camera. The reference camera is connected with the camera or with a 3D sensor which comprises the projector and the camera.

Preferably, a stripe pattern is projected onto the object. The pattern, in particular the stripe pattern, can be projected onto the object by an image-forming element, in particular by a transparency or by a digital pattern generator, in particular a liquid crystal display such as a DLP display, an LCD display and/or an LCOS display. Furthermore, it is possible to project a pattern onto the object, which consists of one or more laser lines. The laser lines can be oriented parallel to each other and/or at an angle to each other.

The camera can comprise an optical system and a planar sensor, in particular a CCD sensor and/or a CMOS sensor. The evaluating means can comprise or consist of a computer, in particular a PC.

The recorded shot data can be stored temporarily in a camera memory. They can be passed on before or after the temporary storage or without temporary storage.

The projector and the camera can be structurally integrated in a so-called 3D sensor. The 3D sensor comprises the projector and the camera.

The invention also provides for supplementing an existing apparatus for determining the 3D coordinates of an object according to the generic part of claim 8 in a simple way, in order to be able to determine the 3D coordinates of an object which is larger than the field of view of the camera with this apparatus. Furthermore, it is possible to provide several cameras. For example, a so-called stereo camera can be used, i.e. a combination of two cameras. It is, however, also possible to provide more than two cameras. By using more than one camera, the allocation of the image points recorded by the cameras to the projected lines can be improved.

Advantageous developments are described herein.

Advantageously, the reference marks are projected onto the object.

According to a further advantageous development, the shots of the camera and the shots of the reference camera are effected temporally offset. Instead or in addition, the shots of the camera and the shots of the reference camera can be effected at the same time.

Advantageously, several shots of the camera are put together. For putting the shots together, matching methods can be employed in addition.

A further advantageous development is characterized in that in a first measurement run the positions of the reference marks are detected and stored. The first measurement run can be carried out without surveying (determining the 3D coordinates) the object. It is, however, also possible to also survey an object in this first measurement run. The detected positions of the reference marks can be transformed into the superordinate coordinate system. The detected and/or transformed positions can be stored.

It may be advantageous when the 3D coordinates of an object are determined on the basis of stored positions of the reference marks. This is advantageous in particular when in a first measurement run the positions of the reference marks are detected and possibly transformed and stored. It is, however, also possible to determine the 3D coordinates of an object on the basis of positions of the reference marks which have already been stored. By using the stored positions of the reference marks, measurement time can be saved. It may, however, also be advantageous to newly determine the positions of the reference marks during a or each determination of the 3D coordinates of an object.

An advantageous development of the apparatus according to the invention is characterized by a projector for projecting the reference marks onto the object.

BRIEF DESCRIPTION OF THE DRAWINGS

An exemplary embodiment of the invention will be explained in detail below with reference to the attached drawing, in which:

FIG. 2 shows a modified apparatus according to FIG. 1.

DESCRIPTION OF THE PREFERRED EMBODIMENTS

Figure 1:
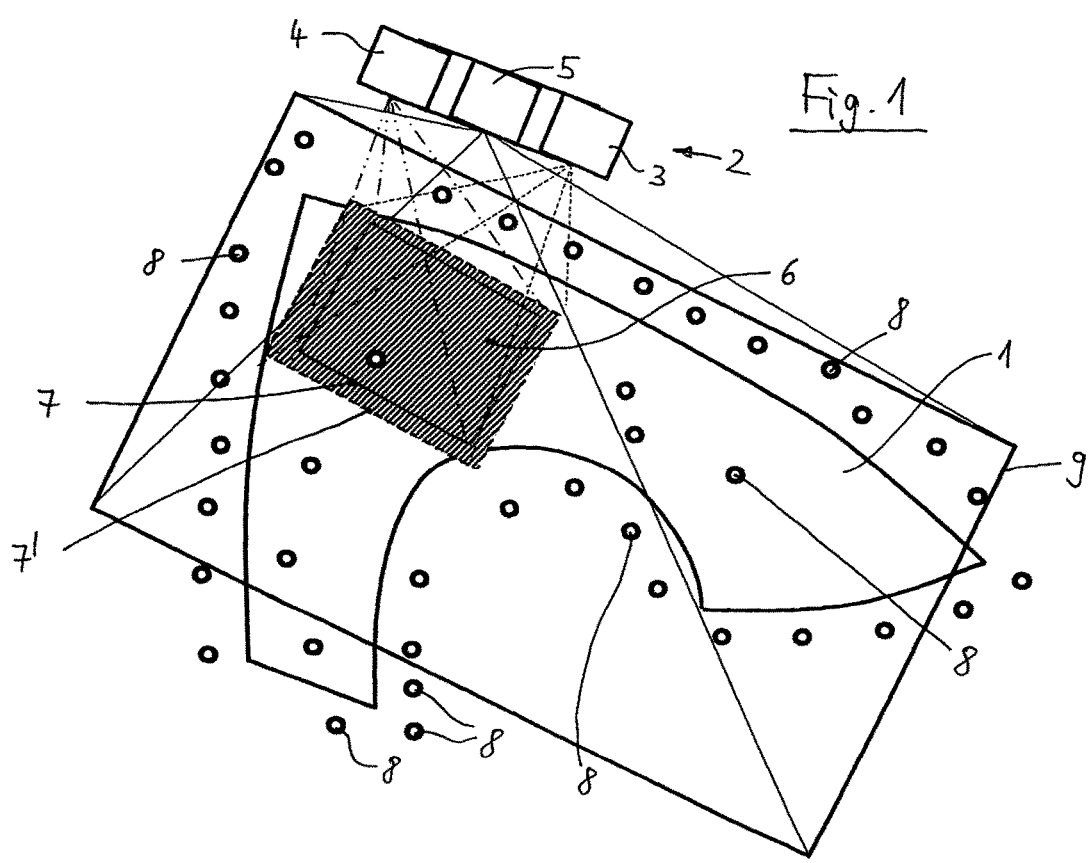
FIG. 1 shows an apparatus for determining the 3D coordinates of an object with a projector, a camera and a reference camera.

FIG. 1 shows an apparatus for determining the 3D coordinates of an object 1, namely a fender of a motor vehicle. The apparatus comprises a 3D sensor 2 which comprises a projector 3 and a camera 4. The apparatus furthermore comprises a reference camera 5 which is connected with the 3D sensor 2. In the exemplary embodiment, the reference camera 5 is located between the projector 3 and the camera 4.

A pattern, namely a stripe pattern 6, is projected onto the object 1 by the projector 3. The light reflected by the object 1 in the region of the stripe pattern 6 is captured by the camera 4.

The shot of the camera 4 is forwarded to an evaluating means (not shown in the drawing), by which it is evaluated. From the shot, the 3D coordinates of the object 1 can be determined in the field of view 7 of the camera 4. The contour 7' of the stripe pattern 6 is larger than the field of view 7 of the camera 4. The contour 7' encloses the field of view 7 on all sides. The camera 4 includes an area sensor which captures the object 1 preferably in the entire field of view 7 of the camera 4.

Onto the object 1 and the surroundings of the object 1 reference marks 8 are projected by a further projector (not shown in the drawing). The reference marks which are located within the field of view 9 of the reference camera 5 are captured by the reference camera 5.

The field of view 9 of the reference camera 5 is larger than the field of view 7 of the camera 4. Furthermore, the field of view 9 of the reference camera 5 encloses the field of view 7 of the camera 4 on all sides. The reference marks 8, which are located within its field of view 9, are picked up by the reference camera 5. The position and the orientation of the reference camera 5 can be determined therefrom.

After the part of the object 1, which is located within the field of view 7 of the camera 4, has been recorded by the camera 4, the apparatus comprising the projector 3, the camera 4 and the reference camera 5 is positioned at another point. This positioning is made such that the field of view 7 of the camera 4 is located at another point of the object 1, preferably at a point beside the original field of view 7. The field of view which the camera 4 covers in its new position can overlap with the original field of view 7 of the camera 4. Due to the fact that the field of view 9 of the reference camera 5 is larger than the field of view 7 of the camera 4, it is ensured that the reference camera 5 in the original position and in the new position can detect a sufficient number of reference marks 8. The number and the positions of the reference marks 8 are chosen such that a sufficient number of reference marks 8 is present, which the reference camera 5 can detect in both positions. In this way, a global registration of the shots of the camera 4 and hence of the 3D coordinates of the object 1 is ensured.

Due to the fact that the projector 2 which projects the stripe pattern 6 onto the object 1 is connected with the camera 4 and the reference camera 6, the stripe pattern 6 is moved along with a movement of the apparatus which comprises the projector 3, the camera 4 and the reference camera 5.

FIG. 2 shows an apparatus in which a projector 3' is present, which projects laser lines 10 onto the object 1. Some laser lines 10 extend parallel to the long side of the field of view 7 of the camera 4. Further laser lines 10 extend parallel to the narrow side of the field of view 7 of the camera 4. A further laser line 10 extends at an angle to the edges of the field of view 7 of the camera 4.

The size of the field of view of the camera 4 and/or the reference camera 5 can be determined by the focal length of the associated optics. Instead or in addition, the field of view can be determined by the sensor size. The shots of the reference camera 5 can be transmitted to an evaluation system, in particular a PC. The 3D coordinates of the reference marks 8 can mathematically be calculated therefrom. In this way, photogrammetry points can be obtained. Subsequently, these photogrammetry points and the positions of the reference camera 5 and of the camera 4 calculated by the photogrammetry can be used for accurately aligning and registering the data, i.e. the 3D coordinates.

For determining the 3D coordinates of the object 1, the positions of the reference marks 8 can be detected and stored in a first measurement run. In a second measurement run, these positions then can be used for determining the 3D coordinates of the object 1. In further measurement runs they can be used for determining the 3D coordinates of the object 1 or for determining the 3D coordinates of further objects.

The invention claimed is:

1. A method for determining the 3D coordinates of an object (1), comprising:
   a pattern (6) is projected onto the object (1) by a projector (3);
   a light reflected by the object (1) is captured by a camera (4);
   camera shots recorded by the camera (4) are evaluated,
   reference marks (8) on and/or beside the object (i) are recorded by a reference camera (5) by reference camera shots, the reference camera having a larger field of view (9) than the camera (4),
   the one and only reference camera (5) is connected with a 3D sensor (2) which comprises the projector (3) and the camera (4) so that the pattern (6) projected by the projector moves along with a movement of each of the projector (3), the camera (4) and the reference camera (5), and wherein a number and positioning of the reference marks (8) are chosen such that when the reference camera (5) changes position, a number of reference marks (8) are present for the reference camera (5) to detect, when capturing a subsequent picture of the object (1), and
   wherein a contour (7') of the pattern (6) from the projector (3) is greater than and encloses a field of view of the camera (4).

2. The method according to claim 1, wherein the reference marks (8) are projected onto the object (1).

3. The method according to claim 2, wherein the camera shots of the camera (4) and the reference camera shots of the reference camera (5) are effected at the same time.

4. The method according to claim 3, wherein several shots of the camera (4) are put together.

5. The method according to claim 2, wherein several shots of the camera (4) are put together.

6. The method according to claim 2, wherein the camera shots of the camera (4) and the reference camera shots of the reference camera (5) are effected temporally offset.

7. The method according to claim 6, wherein several shots of the camera (4) are put together.

8. The method according to claim 1, wherein the camera shots of the camera (4) and the reference camera shots of the reference camera (5) are effected temporally offset.

9. The method according to claim 8, wherein several shots of the camera (4) are put together.

10. The method according to claim 1, wherein the camera shots of the camera (4) and the reference camera shots of the reference camera (5) are effected at the same time.

11. The method according to claim 10, wherein several shots of the camera (4) are put together.

12. The method according to claim 1, wherein several camera shots of the camera (4) are put together.

13. The method according to claim 1, wherein in a first measurement run the positions of the reference marks (8) are detected and stored.

14. The method according to claim 1, wherein the 3D coordinates of an object (1) are determined on the basis of stored positions of the reference marks (8).

15. An apparatus for determining the 3D coordinates of an object (1), in particular for carrying out the method according to claim 1, comprising:
   a projector (3) for projecting a pattern (6) onto the object (1);
   a camera (4) for recording the object (1);
   an evaluating means for evaluating the shots of the object (1); and
   a reference camera (5) for recording reference marks (8) on and/or beside the object (1), which has a larger field of view (9) than the camera (4),
   wherein the reference camera (5) is connected with a 3D sensor (2) which comprises the projector (3) and the camera (4) so that the pattern (6) projected by the projector moves along with a movement of each of the projector (3), the camera (4) and the reference camera (5), and
   wherein a number and positioning of the reference marks (8) are chosen such that when the reference camera (5) changes position, a sufficient number of reference marks (8) are present for the reference camera (5) to detect, when capturing a subsequent picture of the object (1).

16. The apparatus according to claim 15, comprising a projector for projecting the reference marks (8) onto the object (1).

17. The method of claim 1, wherein the pattern (6) is moved along with the movement of the projector (3), the camera (4) and the reference camera (5) after the camera (4) has captured a part of the object (1) a first time and the projector (3), the camera (4), and the reference camera (5) are moving to take a subsequent picture of the object (1).

18. The method of claim 1, wherein the projector (3), the camera (4) and the reference camera (5) are directly connected to each other.

19. The method of claim 1, wherein when the reference camera (5) moves to a new location, the camera (4) and the projector (3) always move to a corresponding new location.

20. The method of claim 1, wherein when the reference camera (5) moves to a new location, a location of the camera (4) or the projector (3) is always at least partially moved as well.

* * * * *